United States Patent
Minoshima et al.

(10) Patent No.: US 7,295,761 B2
(45) Date of Patent: Nov. 13, 2007

(54) TRANSMITTING APPARATUS AND CONTROL METHOD THEREFOR AND RECEIVING APPARATUS AND CONTROL METHOD THEREFOR

(75) Inventors: Kunihiro Minoshima, Saitama (JP); Hidemi Usuba, Saitama (JP); Shinsuke Nishimura, Saitama (JP); Kinya Ono, Saitama (JP)

(73) Assignee: Pioneer Corporation, Tokyo (JP)

( * ) Notice: Subject to any disclaimer, the term of this patent is extended or adjusted under 35 U.S.C. 154(b) by 1097 days.

(21) Appl. No.: 10/144,810

(22) Filed: May 15, 2002

(65) Prior Publication Data

US 2002/0172493 A1  Nov. 21, 2002

(30) Foreign Application Priority Data

May 17, 2001  (JP)  ............... 2001-148532

(51) Int. Cl.
*H04N 5/76* (2006.01)
*H04N 7/00* (2006.01)
(52) U.S. Cl. .......................... 386/96; 386/46
(58) Field of Classification Search ............. 370/232, 370/229; 386/54, 96, 104, 105–106
See application file for complete search history.

(56) References Cited

U.S. PATENT DOCUMENTS

| 5,666,451 | A | * | 9/1997 | Kim .......................... 386/97 |
| 5,715,357 | A | * | 2/1998 | Yamagata et al. ............ 386/96 |
| 5,815,634 | A | | 9/1998 | Daum et al. |
| 6,208,802 | B1 | * | 3/2001 | Mori et al. .................... 386/96 |
| 2001/0001024 | A1 | | 5/2001 | Yanagihara et al. |

FOREIGN PATENT DOCUMENTS

| EP | 1 024 493 A2 | 8/2000 |
| JP | 11-205408 | 7/1999 |
| JP | 2000-151719 | 5/2000 |
| JP | 2000-151720 | 5/2000 |

* cited by examiner

*Primary Examiner*—Thai Q. Tran
*Assistant Examiner*—Nigar Chowdhury
(74) *Attorney, Agent, or Firm*—Sughrue Mion, PLLC

(57) ABSTRACT

There are provided the controlling methods of the transmitting apparatus and the receiving apparatus, which cancel the flow control to execute the normal reproduction by the user who looks at the warning display or in response to the reception of the flow control cancel signal from the receiver side. Otherwise, there are provided the controlling methods of the transmitting apparatus and the receiving apparatus, which cancel the flow control reception to execute the normal reception without the buffer if the contents with the video is reproduced.

7 Claims, 8 Drawing Sheets

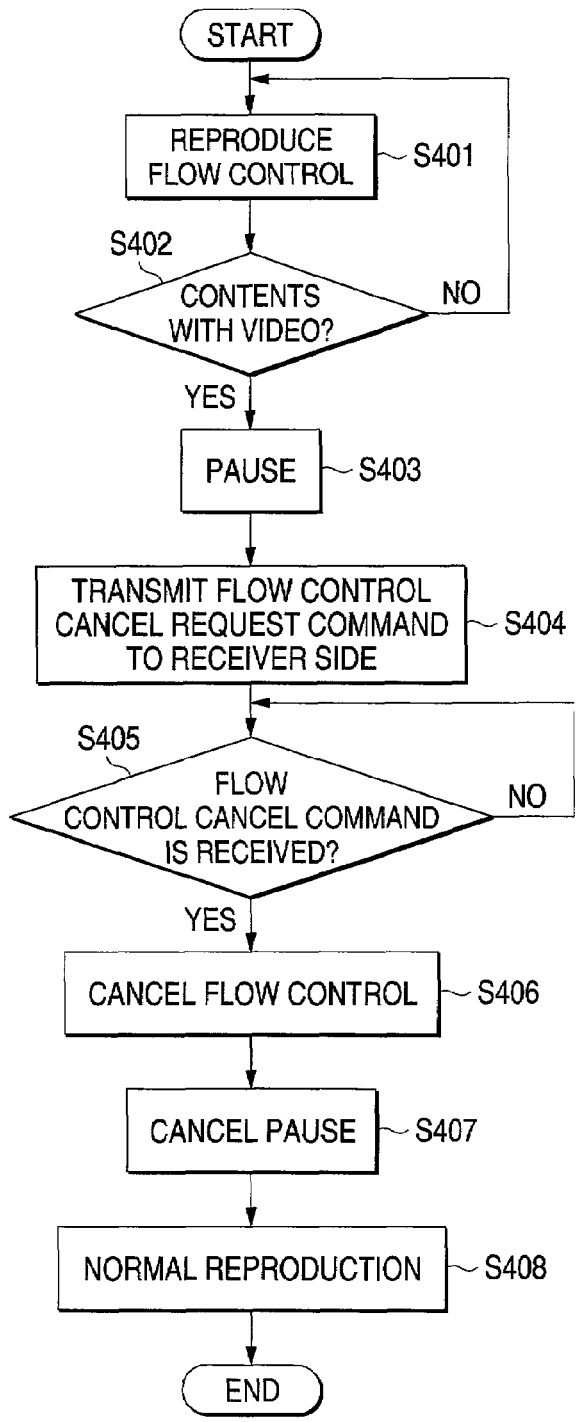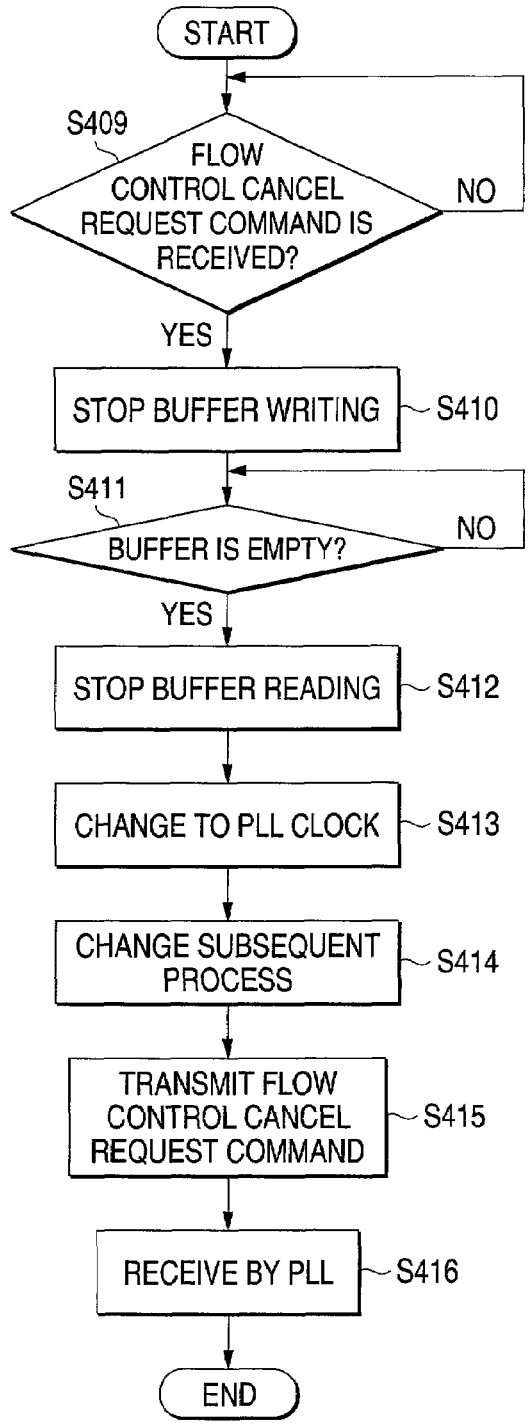

TRANSMITTING APPARATUS AND CONTROL METHOD THEREFOR AND RECEIVING APPARATUS AND CONTROL METHOD THEREFOR

The present disclosure relates to the subject matter contained in Japanese Patent Application No. 2001-148532 filed on May 17, 2001, which is incorporated herein by reference in its entirety.

BACKGROUND OF THE INVENTION

1. Field of the Invention

The present invention relates to a transmitting apparatus for transmitting the audio data reproduced from the recording medium to the network and its control method, and a receiving apparatus for receiving the above audio data and its control method.

2. Description of the Related Art

The digital audio/video system capable of achieving the high quality-of-audio reproduction by transmitting the digital audio data or digital video data, which is reproduced by the reproducing device such as the DVD (Digital Versatile Disc) player, etc., to the network including the transmission line such as the serial bus (IEEE Std. 1394-1955 IEEE Standard for a High Performance Serial Bus) based on the IEEE 1394 standard, etc. and also receiving the audio data by the receiving apparatus such as the amplifier, etc., is being implemented.

According to such digital audio/video system, such a flow control is carried out that the audio data are stored in the buffer on the receiving apparatus side and also the reproducing speed on the transmitter side is controlled within the speed variation of ±1% not to cause the overflow or the underflow of such buffer.

According to this flow control, since the receiving apparatus can read the audio data stored in the buffer by using the clock with the quartz precision, the high quality audio output can be achieved without the jitter component.

Out of the DVD-Audio discs that are reproduced by the reproducing apparatus such as the DVD player, etc., there is the disc in which the portion (track) containing the audio only and the portion (track) containing the video and the audio are present.

When the data reproduced from such DVD-Audio disc are transmitted/received according to the above flow control, the problem is not particularly caused in reproducing the portion (track) containing the audio only.

However, in the reproduction of the portion (track) containing the video and the audio, since the reproducing clock on the reproducing device side is controlled by the receiving apparatus within the maximum variation of ±1%, there is caused the problem that the distortion of the video image may be generated. Further, there is caused the problem that, since the audio data are buffered in the receiving apparatus, the coincidence of timings between the video and the audio (so-called lip synchronization) is lost.

The present invention has been made in view of the problems mentioned above, and it is an object of the present invention to provide a transmitting apparatus and a control method therefor and a receiving apparatus and a control method therefor capable of eliminating the distortion of the video and also attaining the lip synchronization even when the portion of the DVD-Audio disc, etc., in which the video and the audio are contained, is reproduced.

SUMMARY OF THE INVENTION

According to a first aspect of the invention, there is provided a transmitting apparatus enabling to reproduce a recording medium in compliance with a flow control and to transmit video data and audio data to a network, the transmitting apparatus having:

a first detecting device for detecting whether a reproduced content is a content with video;

a second detecting device for detecting reception of a flow control cancel command output from a receiving apparatus that receives the audio data, if the reproduced content is the content with the video; and a flow control canceling device for canceling the flow control in response to detection of the flow control cancel command.

Therefore, if the content with the video is reproduced, the flow control is canceled. As a result, if the video and the audio are reproduced simultaneously, the audio reproduction to eliminate the distortion of the video and to attain the lip synchronization can be achieved.

According to a second aspect of the invention, there is provided the transmitting apparatus according to the first aspec, further having:

a generating device for generating a warning display signal;

a device for outputting the warning display signal as a video output signal if the reproduced content is the content with video; and a device for outputting a video signal for the content with the video as the video output signal after the flow control is canceled.

Therefore, if the content with the video is reproduced, the display video is changed into the warning display. As a result, the user who looks at this warning display can cancel the flow control.

According to a third aspect of the invention, there is provided the transmitting apparatus according to the first aspect of the invention, further comprising:

a device for stopping temporarily reproduction of the recording medium if the reproduced content is the content with video; and a device for canceling the temporary stop after the flow control is canceled.

Therefore, when the content with the video is reproduced after the reproduced track is changed, etc., the reproduction is temporarily stopped and then the flow control can be canceled at a time when the flow control cancel signal is transmitted from the receiver side.

According to a fourth aspect of the invention, there is provided a receiving apparatus for selecting flow control that stores audio data transmitted from a transmitting apparatus in a buffer and reads the stored audio data based on a reference clock and normal reception that receives a transmitted audio data based on a PLL clock, the receiving apparatus having:

a changing device for changing the flow control to the normal reception; and a device for transmitting a flow control cancel command to the transmitting apparatus after changing to the normal reception is executed.

Therefore, if the audio data of the content with the video is received, the normal reception to receive the data based on the PLL clock can be executed by canceling the flow control, and also the flow control can be canceled by transmitting the flow control cancel command to the transmitting apparatus.

As a result, the audio reproduction to eliminate the distortion of the video and to attain the lip synchronization can be achieved.

According to a fifth aspect of the invention, there is provided the receiving apparatus according to the fourth aspect of the invention, further having detecting device for detecting that the audio data stored in the buffer becomes empty. The changing device changes the flow control to the normal reception in response to detection that the audio data becomes empty.

Therefore, when the normal reception is started after the flow control is canceled, it can be prevented that the end portion or the beginning portion of the audio data transmitted until now is interrupted.

According to a sixth aspect of the invention, there is provided the receiving apparatus according to the fourth aspect of the invention, further having detecting device for acquiring contents information from the transmitting apparatus to detect whether content reproduced by the transmitting apparatus is content with video. The changing device changes the flow control to the normal reception in response to detection that the content reproduced by the transmitting apparatus is the content with video.

Therefore, it is detected from the acquired contents information whether or not the reproduced content is the content with the video. Then, if the reproduced contents are the contents with the video, the normal reception not to use the buffer can be carried out by canceling automatically the flow control.

According to a seventh aspect of the invention, there is provided a controlling method of a transmitting apparatus enabling to reproduce a recording medium in compliance with a flow control and to transmit video data and audio data to a network, having the steps of:

detecting whether a reproduced content is a content with video;

detecting reception of a flow control cancel command output from a receiving apparatus, if the reproduced content is the content with the video; and canceling the flow control in response to detection of the flow control cancel command.

Therefore, if the content with the video is reproduced, the flow control is canceled. As a result, if the video and the audio are reproduced simultaneously, the audio reproduction to eliminate the distortion of the video and attain the lip synchronization can be achieved.

According to an eighth aspect of the invention, there is provided the controlling method according to the seventh aspect of the invention, further having the steps of:

generating a warning display signal;

outputting the warning display signal as a video output signal if the reproduced content is the content with video; and outputting a video signal for the content with the video as the video output signal after the flow control is canceled.

Therefore, if the content with the video is reproduced, the display video is changed to the warning display. As a result, the user who looks at this warning display can cancel the flow control.

According to a ninth aspect of the invention, there is provided the controlling method according to the seventh aspect of the invention, further having the steps of:

stopping temporarily reproduction of the recording medium if the reproduced content is the content with video; and canceling the temporary stop after the flow control is canceled.

Therefore, when the content with the video is reproduced after the reproduced track is changed, etc., the reproduction is temporarily stopped and then the flow control can be canceled at a time when the flow control cancel signal is transmitted from the receiver side.

According to a tenth aspect of the invention, there is provided a controlling method of a receiving apparatus for selecting flow control that stores audio data transmitted from a transmitting apparatus in a buffer and reads stored audio data based on a reference clock and normal reception that receives a transmitted audio data based on a PLL clock, the controlling method having the steps of:

changing the flow control to the normal reception; and transmitting a flow control cancel command to the transmitting apparatus after changing into the normal reception is executed.

Therefore, if the audio data of the content with the video are received, the normal reception to receive the data based on the PLL clock can be executed by canceling the flow control, and also the flow control can be canceled by transmitting the flow control cancel command to the transmitting apparatus. As a result, the audio reproduction to eliminate the blink of the video and attain the lip synchronization can be achieved.

According to an eleventh aspect of the invention, there is provided The controlling method according to the tenth aspect of the invention, further having the steps of detecting that the audio data stored in the buffer becomes empty. The step of changing the flow control to the normal reception changes the flow control to the normal reception in response to detection that the audio data becomes empty.

Therefore, when the normal reception is started after the flow control is canceled, it can be prevented that the end portion or the beginning portion of the audio data transmitted until now is interrupted.

According to a twelfth aspect of the invention, the controlling method according to the tenth aspect of the invention, further having the steps of acquiring contents information from the transmitting apparatus to detect whether content reproduced by the transmitting apparatus is content with video. The step of changing the flow control to the normal reception changes the flow control to the normal reception in response to detection that the content reproduced by the transmitting apparatus are the content with video.

Therefore, it is detected from the acquired contents information whether or not the reproduced contents are the contents with the video. Then, if the reproduced contents are the contents with the video, the normal reception not to use the buffer can be carried out by canceling automatically the flow control.

BRIEF DESCRIPTION OF THE DRAWINGS

Exemplary embodiments are described below based on the drawings, in which like numerals represent like parts, and wherein:

FIGS. 7(A) and 7(B) are flowcharts showing a controlling method of the receiving apparatus according to the fourth embodiment.

DETAILED DESCRIPTION OF THE PREFERRED EMBODIMENTS

Embodiments according to the present invention will be explained in detail with reference to the drawings hereinafter.

First Embodiment

A first embodiment according to the present invention will be explained hereunder.

First, a configuration of a transmitting apparatus (DVD player) will be explained hereunder.

Figure 1:
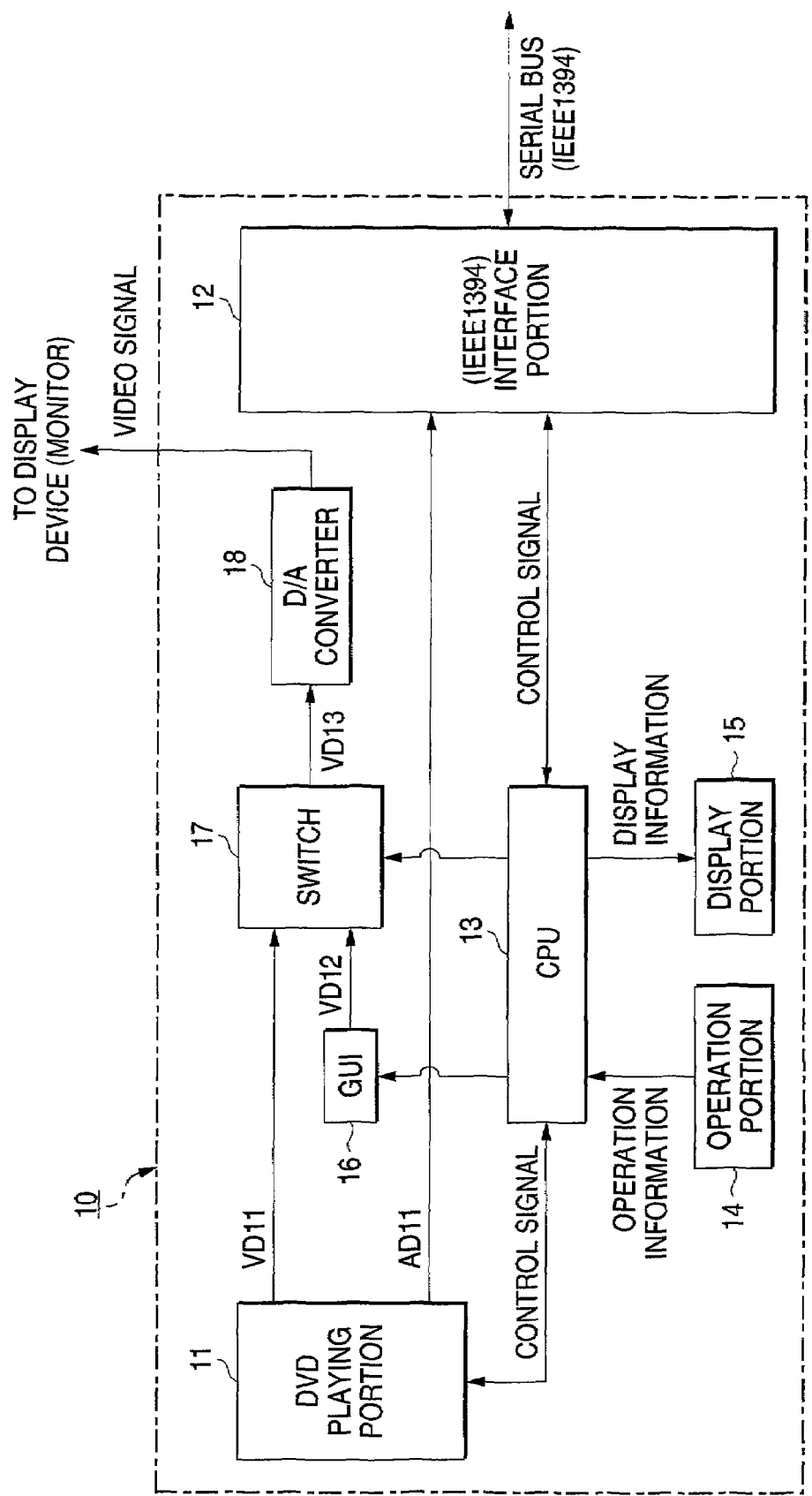
FIG. 1 is a block diagram showing a configuration of a transmitting apparatus (DVD player) according to first to fourth embodiments.

FIG. 1 is a block diagram showing a configuration of the transmitting apparatus (DVD player) according to first to fourth embodiments.

As shown in FIG. 1, the transmitting apparatus (DVD player) 10 has a DVD playing portion 11, an I/F portion 12 based on the IEEE 1394 standard, a CPU 13, an operation portion 14, a display portion 15, a GUI 16, a video data switch 17, and a DA converter 18.

Then, connections and configurations of respective blocks of the transmitting apparatus (DVD player) 10 will be explained hereunder.

As shown in FIG. 1, the DVD playing portion 11 is connected to the video data switch 17 to output the video data VD11 of the reproduced contents, connected to the I/F portion 12 to output the audio data AD11 of the reproduced contents, and connected to the CPU 13 to input/output the control signal into/from the CPU 13.

The I/F portion 12 is connected to the serial bus based on the IEEE 1394 standard and connected to the network. Also, the I/F portion 12 is connected to input/output the control signal into/from the CPU 13 and also connected to receive the audio data AD11.

The CPU 13 is connected to receive the operation information, which is used to operate the transmitting apparatus (DVD player) 10 from the outside, from the operation portion 14 and to output the display information to the display portion 15 that displays the internal information to the outside, respectively.

Also, the CPU 13 is constructed to control respective blocks in the transmitting apparatus (DVD player) 10 and to input/output the control signal into/from the DVD playing portion 11, the I/F portion 12, the GUI 16, and the video data switch 17.

The GUI 16 is connected to receive the control signal from the CPU 13 and to output the video data VD12 for the warning display to the video data switch 17.

The video data switch 17 is connected to receive the video data VD11 and the video data VD12 for the warning display and to output the video data VD13 to the DA converter 18.

The DA converter 18 is connected to receive the video data VD13 and to output the DA-converted analog video signal to the outside.

Figure 2:
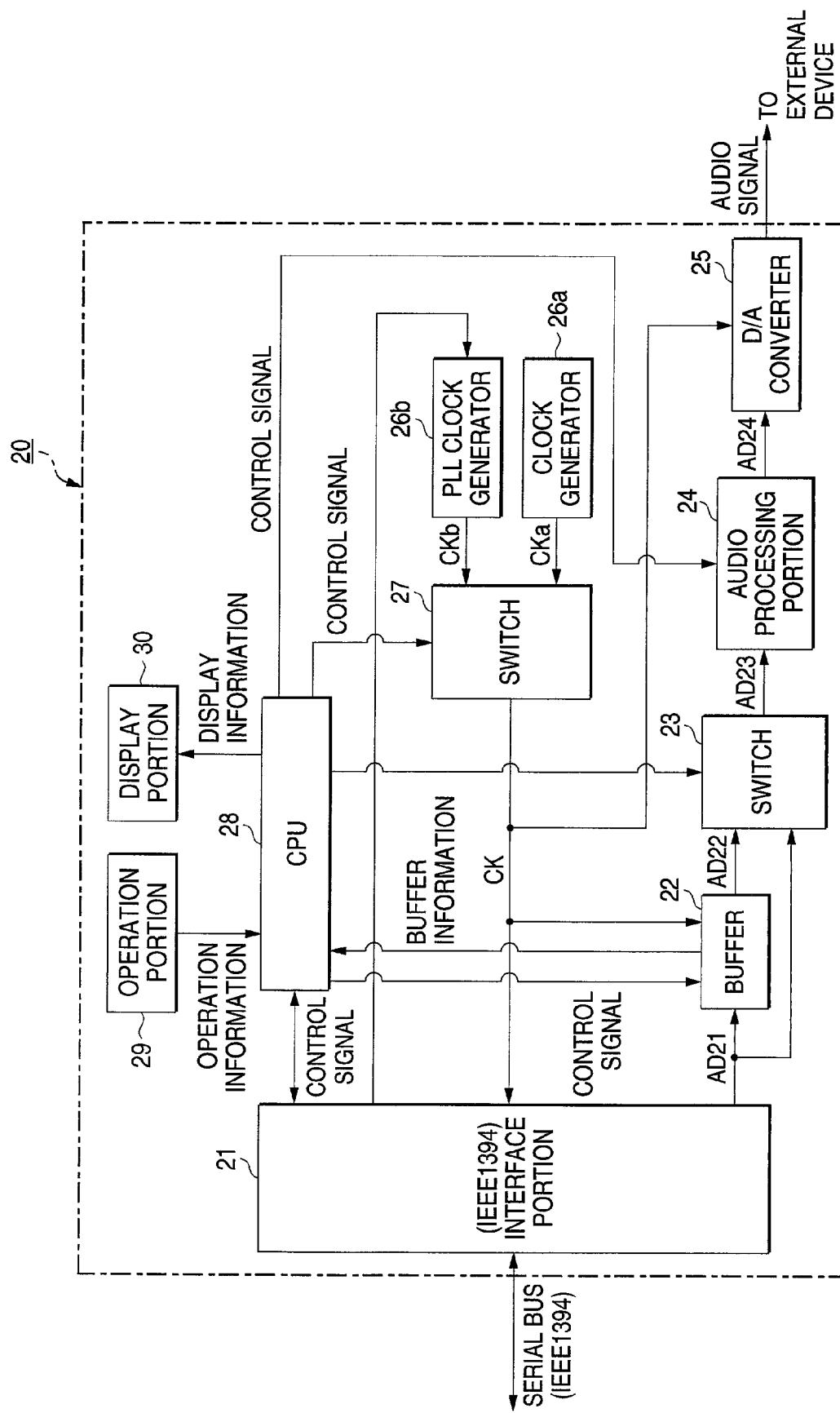
FIG. 2 is a block diagram showing a configuration of a receiving apparatus (amplifier) according to the first to fourth embodiments.

FIG. 2 is a block diagram showing a configuration of a receiving apparatus (amplifier) according to the first to fourth embodiments.

As shown in FIG. 2, the receiving apparatus (amplifier) 20 according to the first embodiment has an I/F portion 21, a buffer 22, a data changing switch 23, an audio processing portion 24, a DA converter 25, reference clock generators 26a, 26b, a reference clock changing switch 27, a CPU 28, an operation portion 29, and a display portion 30.

Next, connections and configurations of respective blocks of the receiving apparatus (amplifier) 20 will be explained hereunder.

As shown in FIG. 2, the I/F portion 21 is connected to a serial bus based on the IEEE 1394 standard and connected to the network. Also, the I/F portion 21 is connected to input/output the control signal into/from the CPU 28, and also is connected to output the audio data AD21 to the buffer 22.

The buffer 22 is connected to output the audio data AD22 to the data changing switch 23, and also is connected to output the buffer information to the CPU 28 and to receive the control signal from the CPU 28.

The data changing switch 23 is connected to switch the input audio data AD21 and the audio data AD22 and to output the audio data AD23 to the audio processing portion 24. Also, the data changing switch 23 is connected to receive the control signal from the CPU 28.

The audio processing portion 24 is connected to output the audio data AD24 to the DA converter 25, and also is connected to receive the control signal from the CPU 28.

The DA converter 25 is constructed such that such converter can connect the DA-converted audio signal to an external device (e.g., loudspeaker), etc.

The first reference clock generators 26a is constructed to generate the first reference clock CKa (used in the case of the flow control).

The second reference clock generators 26b is constructed to generate the second reference clock CKb (used in the case of the normal reception) by PLL.

The reference clock changing switch 27 is constructed to receive the first reference clock CKa supplied from the first reference clock generator 26a, the second reference clock CKb supplied from the second reference clock generator 26b, and the reference clock changing control signal being output from the CPU 28 and to supply the changed reference clock CK to respective blocks (the I/F portion 21, the buffer 22, and the DA converter 25) in the receiving apparatus (amplifier) 20.

The CPU 28 is connected to receive the operation information, which is used to operate the receiving apparatus (amplifier) 20 from the outside, from the operation portion 29 and to output the display information to the display portion 30 that displays the internal information to the outside, respectively.

Also, the CPU 28 is constructed to control respective blocks in the receiving apparatus (amplifier) 20. More particularly, the CPU 28 is constructed to input/output the control signal into/from the I/F portion 21, to receive the buffer information from the buffer 22, to output the control signal to the buffer 22, to output the control signal to the reference clock changing switch 27, to output the control signal to the data changing switch 23, and to output the control signal to the audio processing portion 24.

The transmitting apparatus (DVD player) 10 according to the embodiment reproduces the data from the recording medium such as the DVD-Audio disc, etc. in compliance with flow control and then transmits the video data and the audio data to the network.

The feature of the transmitting apparatus (DVD player) 10 according to the present embodiment is that a plurality of functions for executing the flow control by transmitting the control signal from the CPU 13 are provided. These functions are given as follows.

(1) A first detecting function for detecting whether or not the contents reproduced by the DVD playing portion 11 are the contents with the video, (2) a video data changing function for changing the video displayed on the monitor into the warning display in response to an output of the first detecting function, (3) a second detecting function for detecting reception of a flow control cancel command output from the receiving apparatus 20, and (4) a flow control canceling function for canceling the flow control in response to detection of the flow control cancel command.

Figure 3:
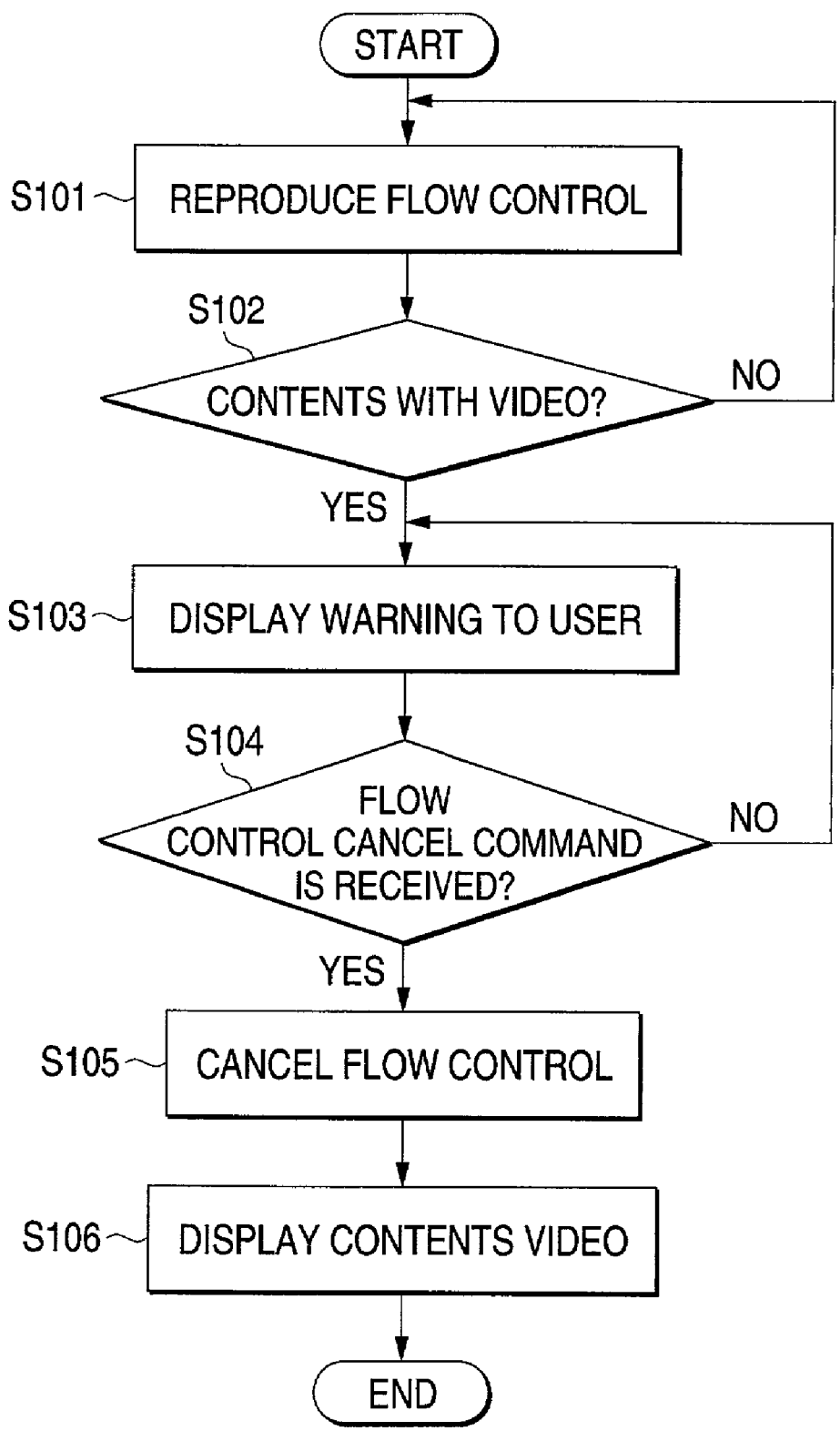
FIG. 3 is a flowchart showing a controlling method of the receiving apparatus according to the first embodiment.

Then, a controlling method of the transmitting apparatus according to the first embodiment will be explained with reference to FIG. 3 hereunder. In FIG. 3, steps S101 to S105 correspond to the control method of the transmitting apparatus.

The transmitting apparatus (DVD player) 10 executes the reproduction in accordance with the flow control (step S101).

Then, the process of detecting whether or not the data reproduced by the DVD playing portion 11 are the contents with the video is carried out (step S102). Then, the process in step S103 is carried out if the contents with the video is detected as the data (Yes) whereas the process goes back to step S101 unless the contents with the video is detected as the data (No).

Then, the CPU 13 sends the control command to the GUI 16, then the GUI 16 transmits the video data VD12 that causes to display the warning to the user to the video data switch 17, and then the video data switch 17 receives the video data changing control signal transmitted from the CPU 13 to output the video data for the warning display to the DA converter 18 (VD13).

The analog video signal that is obtained by DA-converting this VD13 by virtue of the DA converter 18 is output to the external monitor to display the video of the warning display (e.g., the video of the warning display indicating "The video cannot be displayed because the flow control is being reproduced. Please cancel the flow control to display the video") on the monitor (step S103).

Then, the user pushes the ON/OFF button, or the like provided on the operation portion 29 of the receiving apparatus 20 to detect whether or not the CPU 13 has received the flow control cancel command transmitted from the receiving apparatus 20 (step S104). Then, the flow control is canceled in step S105 if the flow control cancel command has been received (Yes), while the process returns to step S103 unless the flow control cancel command has been received (No).

Then, the video data switch 17 receives the video data changing control signal transmitted from the CPU 13 and then outputs the video data VD11 of the contents to the DA converter 18 (VD13). Accordingly, the contents video is displayed on the external monitor (step S106).

Second Embodiment

A second embodiment according to the present invention will be explained hereunder.

A configuration of the transmitting apparatus (DVD player) 10 according to the second embodiment is similar to that of the first embodiment, and the same is true of a configuration of the receiving apparatus (amplifier) 20.

The present embodiment corresponds to the reproducing track change of the transmitting apparatus (DVD player) 10, and also corresponds to the case where the track is changed from the track containing the audio contents only to the track containing the video and the audio contents.

Figure 4:
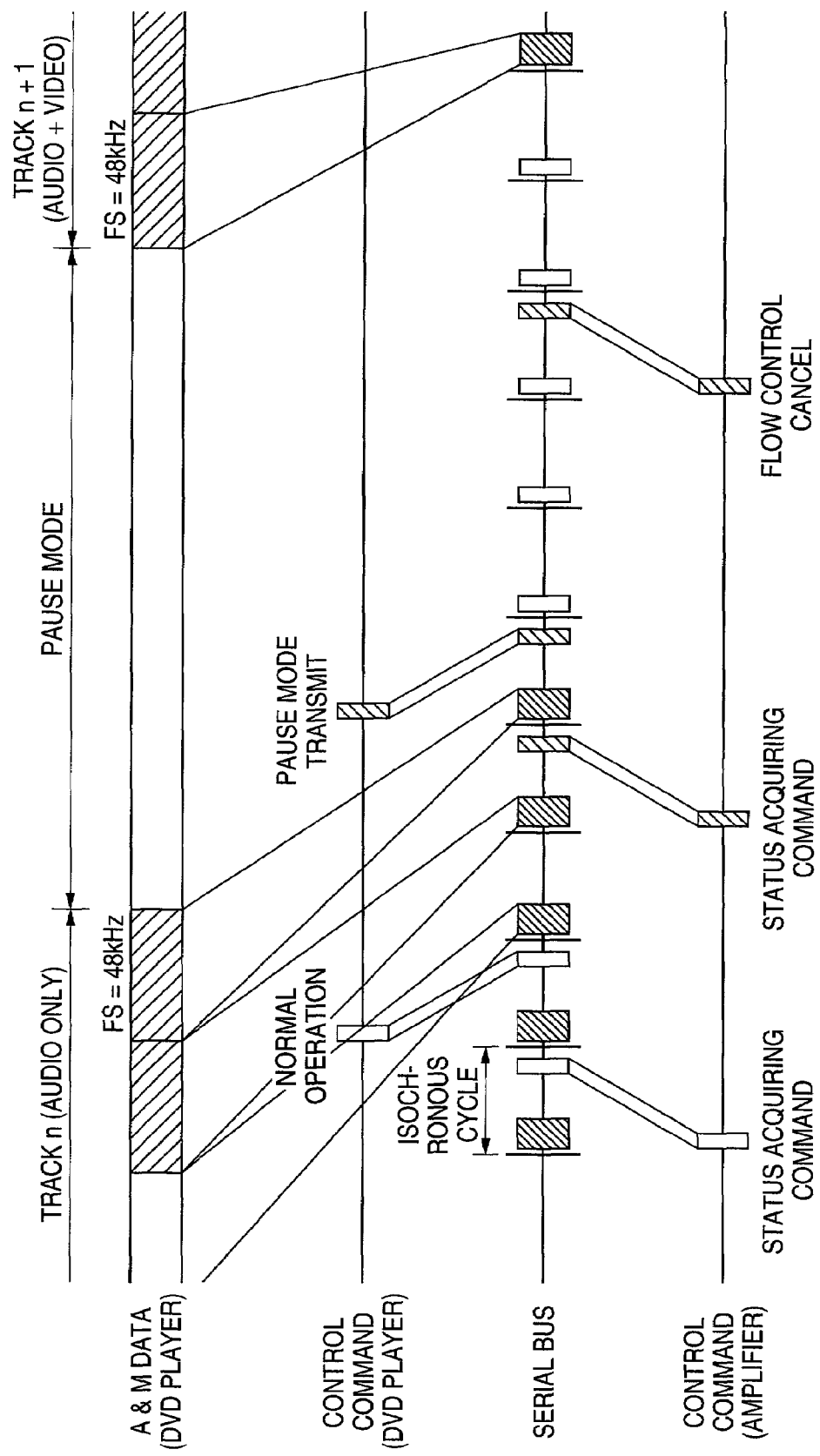
FIG. 4 is a view showing timings of control signals and data between the transmitting apparatus and the receiving apparatus according to the second embodiment.

First, timings of control signals and A&M data between the transmitting apparatus and the receiving apparatus will be shown in FIG. 4 and explained hereunder.

In the case of the track change shown in FIG. 4, the track is changed from the track n containing the audio contents only to the track n+1 containing the video and audio contents via the pause mode.

First, the A&M data having the sampling frequency FS=48 kHz on the track n are stored in the isochronous transmission area on the serial bus.

The receiving apparatus 20 sends out a status acquiring request command to the transmitting apparatus 10 at a constant interval, and then this status acquiring request command is stored in the asynchronous transmission area.

The transmitting apparatus 10 that received the status acquiring request command sends out the signal indicating the pause (caused by switching to the video reproduction) state, and this signal is stored in the asynchronous transmission area. If the receiving apparatus, which received this signal, decided that such pause is caused by switching to the video reproduction, the flow control cancel command is sent out from the receiving apparatus 20 after the processes in the receiver side are ended. Then, the flow control cancel command is stored in the asynchronous transmission area.

Then, the transmitting apparatus (DVD player) 10, which received this flow control cancel command, cancels the pause and then sends out the A&M data having the sampling frequency FS=48 kHz on the track n+1.

In the present embodiment, the transmitting apparatus (DVD player) 10 is constructed to transmit the reproduced data to the network and make it possible to execute the flow control. The receiving apparatus (amplifier) 20 is constructed to select the flow control that stores the data received from the network in the buffer and reads the data in the buffer based on the first reference clock or the normal reception that receives the data received from the network based on the second reference clock.

The feature of the transmitting apparatus (DVD player) 10 according to the present embodiment is that a plurality of functions for executing the flow control by transmitting the control signal from the CPU 13 are provided. These functions are given as follows.

(1) A first detecting function for detecting whether or not the contents reproduced by the DVD playing portion 11 are the contents with the video during the flow control reproduction, (2) a function for stopping temporarily the reproduction of the recording medium if the contents are the contents with the video, (3) a second detecting function for detecting the reception of the flow control cancel command output from the receiving apparatus 20, and (4) a function for canceling the temporary stop to execute the normal reproduction after the flow control reproduction is canceled in response to the detection of the flow control cancel command.

The feature of the receiving apparatus (amplifier) 20 according to the present embodiment is that a plurality of functions for executing the flow control by transmitting the control signal from the CPU 28 are provided. These functions are given as follows.

(1) A detecting function for detecting that the audio data stored in the buffer 22 becomes empty, (2) a changing function for changing the flow control into the normal reception in response to the detection that the audio data becomes empty, and (3) a function for transmitting the flow control cancel command to the transmitting apparatus 10 after the operation is changed into the normal reception.

Controlling methods of the transmitting apparatus and the receiving apparatus according to the second embodiment will be explained with reference to FIG. 5 hereunder.

Figure 5:
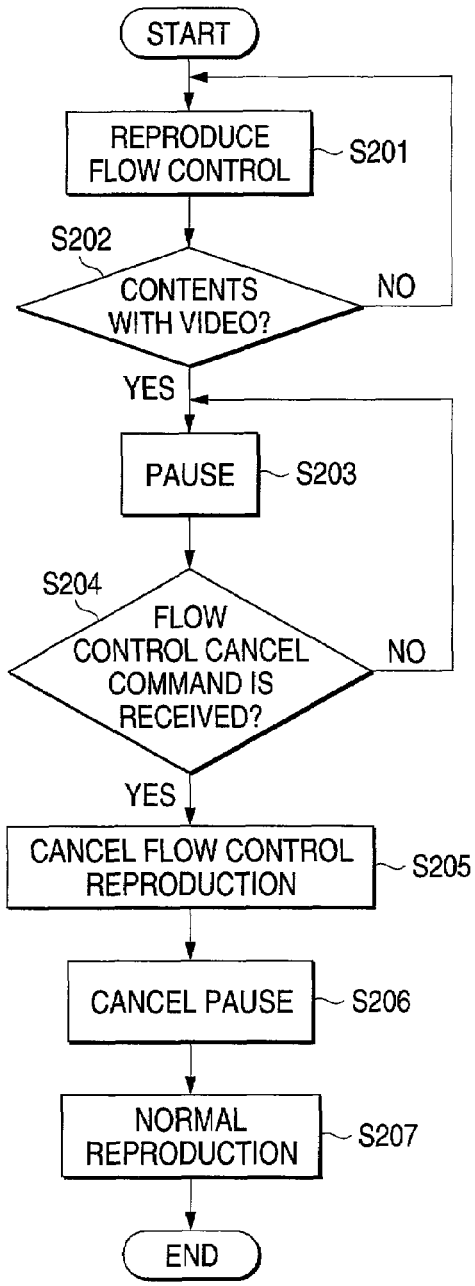
FIGS. 5(A) and 5(B) are flowcharts showing a controlling method of the receiving apparatus according to the second embodiment.
Figure 5:
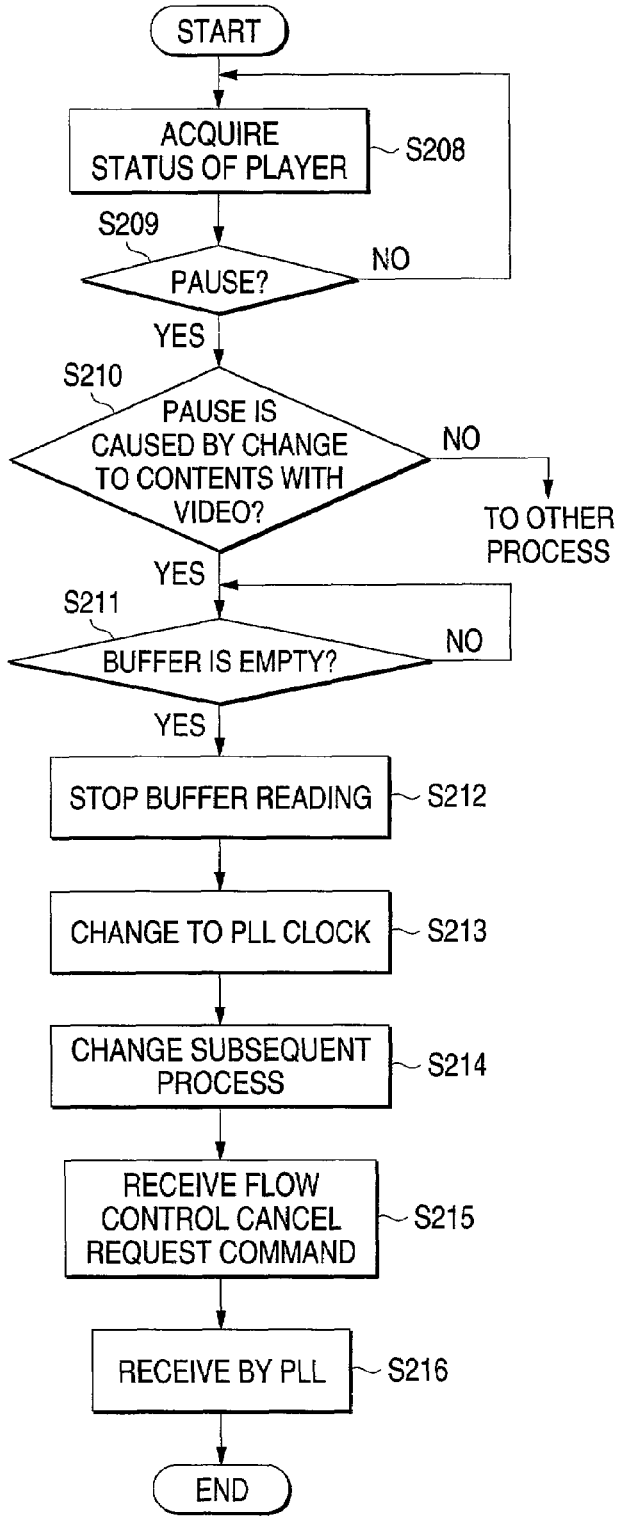

In FIG. 5, steps S201 to S207 in (A) show a flow control method on the transmitting apparatus side, and steps S208 to S216 in (B) show a flow control method on the receiving apparatus side.

A controlling method on the transmitting apparatus (DVD player) 10 side will be explained hereunder.

First, the transmitting apparatus (DVD player) 10 is carrying out the flow control reproduction (step S201).

Then, the process of detecting whether or not the data reproduced by the DVD playing portion 11 are the contents with the video is carried out (step S202). Then, the process in step S203 is carried out if the contents with the video are detected as the data (Yes), while the process goes back to step S201 unless the contents with the video are detected as the data (No).

Then, the DVD playing portion 11 is set in the pause mode (step S203).

Then, the process of detecting whether or not the flow control cancel command is received is carried out (step S204). Then, the flow control is canceled in step S205 if the flow control cancel command is received (Yes) whereas the pause mode in step S203 is maintained unless the flow control cancel command is received (No).

Then, the pause mode of the DVD playing portion 11 is canceled (step S206).

Then, the normal reproduction is carried out (step S207)

A controlling method on the receiving apparatus (amplifier) 20 side will be explained hereunder.

The receiving apparatus (amplifier) 20 is carrying out the flow control reception.

First, the status of the transmitting apparatus (DVD player) 10 is acquired (step S208).

Then, the process of detecting whether or not the pause status command is received from the transmitting apparatus (DVD player) 10 is carried out (step S209). Then, the process in step S210 is carried out if the pause status command is received (Yes) whereas the process returns to step S208 unless the pause status command is received (No).

Then, the process of detecting whether or not the received pause status command indicates that the pause is caused by the change into the contents with the video is carried out (step S210). Then, the process in step S211 is carried out if it is detected that the pause is caused by the change into the contents with the video (Yes), while the process is shifted to other process (not shown) unless it is detected that the pause is caused by the change into the contents with the video (No).

Then, it is detected whether or not the buffer 22 is empty (step S211). Then, the process in step S212 is carried out if it is detected whether or not the buffer 22 is empty (Yes) whereas the process of detecting whether or not the buffer is empty is repeated unless it is detected whether or not the buffer 22 is empty (No).

Then, the reading of the audio data AD22 from the buffer 22 is stopped by sending the reading stop control signal from the CPU 28 to the buffer 22 (step S212).

Then, the reference clock CK is changed from the first reference clock CKa to the second reference clock CKb (clock by the PLL) by sending the reference clock changing command from the CPU 28 to the reference clock changing switch 27 (step S213).

Then, the audio data AD23 to the audio processing portion 24 is changed from the audio data AD22 to the audio data AD21 by sending the change control signal from the CPU 28 to the switch 23 (step S214).

Then, the flow control cancel command is transmitted to the transmitting apparatus (DVD player) 10 (step S215).

Then, the normal reception using the second reference clock CKb by the PLL is carried out (step S216).

Third Embodiment

A third embodiment according to the present invention will be explained hereunder.

A configuration of the receiving apparatus (amplifier) 20 according to the third embodiment is similar to that of the first embodiment, and the same is true of a configuration of the transmitting apparatus (DVD player) 10.

In the present embodiment, the receiving apparatus (amplifier) 20 is constructed to select the flow control that stores the data received from the network in the buffer and reads the data in the buffer based on the first reference clock or the normal reception that receives the data received from the network based on the second reference clock.

The audio data are transmitted from the transmitting apparatus (DVD player) 20, for example.

The feature of the receiving apparatus (amplifier) 20 according to the present embodiment is that a plurality of functions for executing the flow control by transmitting the control signal from the CPU 28 are provided. These functions are given as follows.

(1) A detecting function for acquiring the contents information from the transmitting apparatus 10 to detect whether or not the contents reproduced by the transmitting apparatus 10 are the contents with the video, (2) a changing function for changing the flow control into the normal reception in response to the detection that the contents reproduced by the transmitting apparatus 10 are the contents with the video, and (3) a function for transmitting the flow control cancel command to the transmitting apparatus 10 after the operation is changed into the normal reception.

Figure 6:
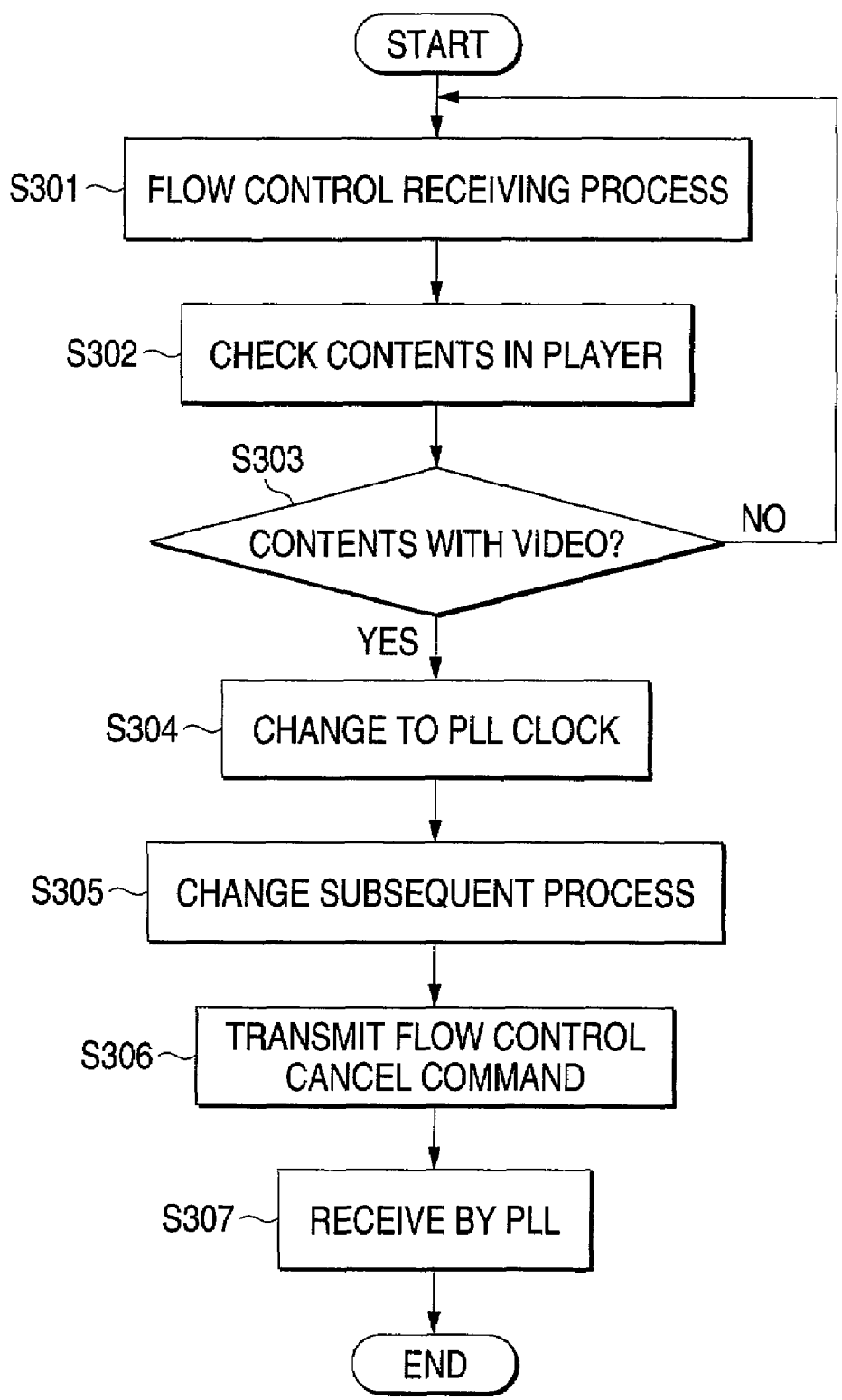
FIG. 6 is a flowchart showing a controlling method of the transmitting apparatus and the receiving apparatus according to the third embodiment.

Then, a controlling method of the receiving apparatus according to the third embodiment will be explained with reference to FIG. 6 hereunder.

First, the receiving apparatus (amplifier) 20 is carrying out the flow control receiving process using the first reference clock CKa (step S301).

Then, the contents information of the transmitting apparatus (DVD player) 10 is acquired by the contents information acquiring command (step S302).

Then, the process of detecting whether or not the contents are the contents with the video is carried out according to the obtained contents information of the transmitting apparatus (DVD player) 10 (step S303). Then, the process in step S304 is carried out if it is detected that the contents are the contents with the video (Yes), while the process goes back to step S301 unless it is detected that the contents are the contents with the video (No).

Then, the reference clock CK is changed from the first reference clock CKa to the PLL clock CKb by sending the reference clock change control signal from the CPU 28 to the reference clock changing switch 27 (step S304). Then, the audio data AD23 to the audio processing portion 24 is changed from the audio data AD22 to the audio data AD21 by sending the change control signal from the CPU 28 to the switch 23 (step S305).

Then, the flow control cancel command is transmitted to the transmitting apparatus 10 (step S306). Then, the normal reception using the PLL clock CKb is executed (step S307).

Fourth Embodiment

A fourth embodiment according to the present invention will be explained hereunder.

A configuration of the transmitting apparatus (DVD player) 10 according to the fourth embodiment is similar to that of the first embodiment, and the same is true of a configuration of the receiving apparatus (amplifier) 20.

In the present embodiment, the transmitting apparatus (DVD player) 10 is constructed to transmit the reproduced data to the network and make it possible to execute the flow control, and the receiving apparatus (amplifier) 20 is constructed to select the flow control reception that stores the data received from the network in the buffer and reads the data in the buffer based on the first reference clock or the normal reception that receives the data received from the network based on the second reference clock.

The feature of the transmitting apparatus (DVD player) 10 according to the present embodiment is that a plurality of functions for executing the flow control by transmitting the control signal from the CPU 13 are provided. These functions are given as follows.

(1) A first detecting function for detecting whether or not the contents reproduced by the DVD playing portion 11 are the contents with the video during the flow control reproduction, (2) a function for stopping temporarily the reproduction of the recording medium if the contents are the contents with the video, (3) a transmitting function for transmitting the flow control cancel request command to the receiving apparatus (amplifier) 20 in response to an output of the first detecting function, (4) a second detecting function for detecting the reception of the flow control cancel command output from the receiving apparatus 20, and (5) a function for canceling the temporary stop to execute the normal reproduction after the flow control reproduction is canceled in response to the detection of the flow control cancel command.

The feature of the receiving apparatus (amplifier) 20 according to the present embodiment is that a plurality of functions for executing the flow control by transmitting the control signal from the CPU 28 are provided. These functions are given as follows.

(1) A function for stopping the data writing into the buffer 22 in response to the reception of the flow control cancel request command transmitted from the transmitting apparatus 10, (2) a changing function for changing the flow control reception into the normal reception in response to the detection that the audio data stored in the buffer 22 becomes empty, and (3) a function for transmitting the flow control cancel command to the transmitting apparatus 10 after the operation is changed into the normal reception.

Then, controlling methods of the transmitting apparatus and the receiving apparatus according to the fourth embodiment will be explained with reference to FIG. 7 hereunder.

In FIG. 7, steps S401 to S408 in (A) show a controlling method on the transmitting apparatus side, and steps S409 to S416 in (B) show a controlling method on the receiving apparatus side.

Then, a flow control on the transmitting apparatus (DVD player) 10 side will be explained hereunder.

Figure 8:
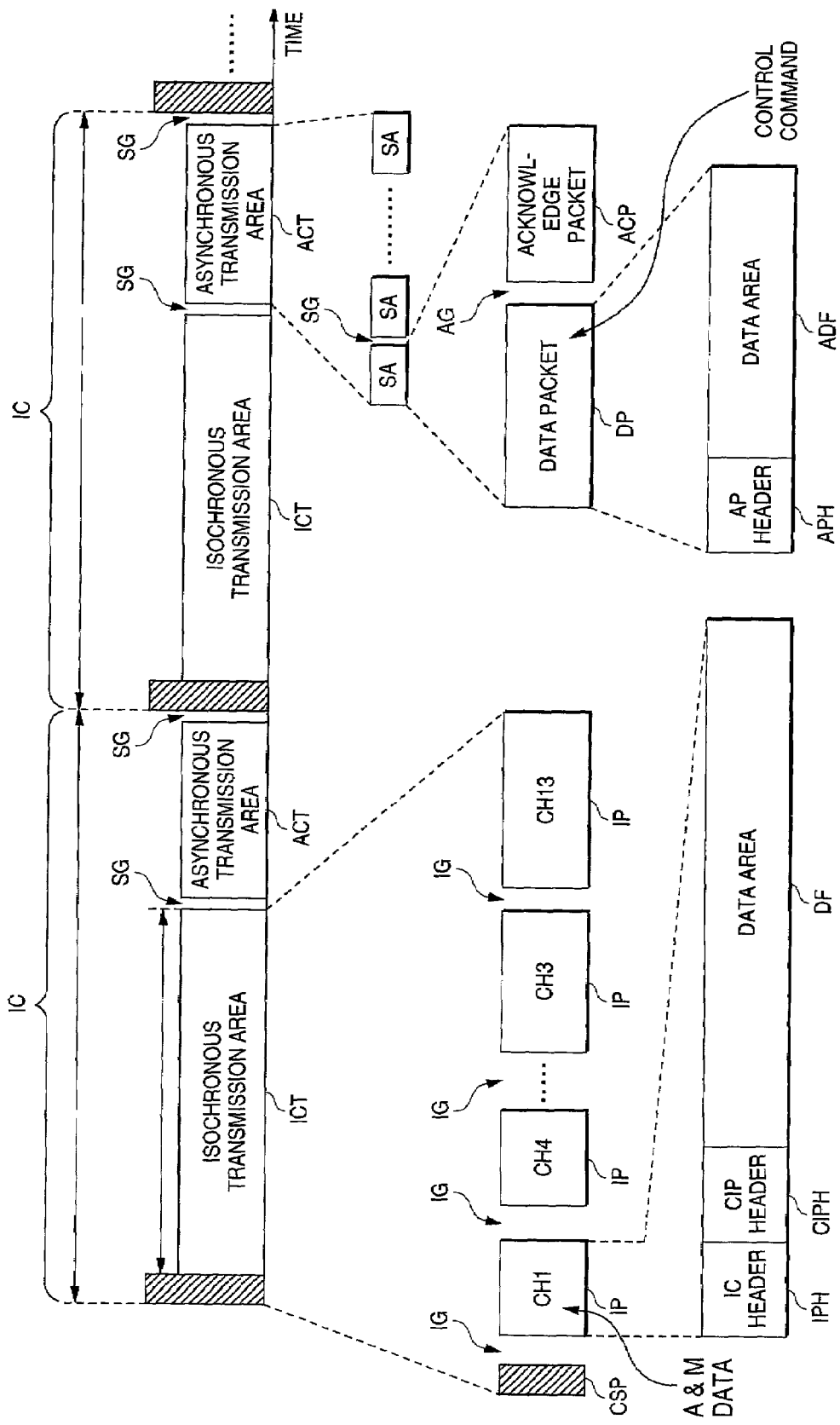
FIG. 8 is a view explaining a data structure in an isochronous cycle.

As shown in FIG. 8, the transmitting apparatus (DVD player) 10 is carrying out the flow control reproduction (step S401).

Then, the process of detecting whether or not the data reproduced by the DVD playing portion 11 are the contents with the video is carried out (step S402). Then, the process in step S403 is carried out if the contents with the video are detected as the data (Yes), while the process goes back to step S401 unless the contents with the video are detected as the data (No).

Then, the DVD playing portion 11 is set in the pause mode (step S403).

Then, the flow control cancel request command is transmitted to the receiving apparatus (amplifier) 20 side (step S404).

Then, the process of detecting whether or not the flow control cancel command is received is carried out (step S405). Then, the process in step S406 is executed if the flow control cancel command is received (Yes) whereas the pause mode is maintained unless the flow control cancel command is received (No).

Then, the flow control is canceled (step S406).

Then, the pause mode of the DVD playing portion 11 is canceled (step S407).

Then, the normal reproduction is carried out (step S408).

A controlling method on the receiving apparatus (amplifier) 20 side will be explained hereunder.

The receiving apparatus (amplifier) 20 is carrying out the flow control reception using the first reference clock CKa.

It is detected whether or not the flow control cancel request command is received (step S409). Then, the process in step S410 is carried out if the flow control cancel request command is received (Yes), while the present status is maintained unless the flow control cancel request command is received (No).

Then, the writing of the audio data AD21 into the buffer 22 is stopped (step S410).

Then, it is detected whether or not the buffer 22 is empty (step S411). Then, the process in step S412 is carried out if it is detected that the buffer 22 is empty (Yes), while the process of detecting whether or not the buffer 22 is empty is repeated unless it is detected that the buffer 22 is empty (No).

Then, the reading of the audio data AD 22 from the buffer 22 is stopped by sending the reading stop control signal from the CPU 28 to the buffer 22 (step S412).

Then, the reference clock CK is changed from the first reference clock CKa to the second reference clock CKb (clock by the PLL) by sending the reference clock changing command from the CPU 28 to the reference clock changing switch 27 (step S413).

Then, the audio data AD23 to the audio processing portion 24 is changed from the audio data AD22 to the audio data AD21 by sending the change control signal from the CPU 28 to the switch 23 (step S414).

Then, the flow control cancel command is transmitted to the transmitting apparatus (DVD player) 10 (step S415).

Then, the normal reception using the second reference clock CKb by the PLL is carried out (step S416).

Then, an isochronous cycle, which is a synchronization unit on IEEE1394 standard serial bus in the network shown in above first to fourth embodiments, will be explained with reference to FIG. 8 hereunder.

FIG. 8 is a view explaining a data structure in the isochronous cycle.

As shown in FIG. 8, the isochronous cycle IC is constructed with a cycle start packet CSP that is always inserted before the head of the isochronous cycle IC to set standard times of all nodes, an isochronous transmission area ICT that has isochronous packets IP of a plurality of channels in each of which the data corresponding to each channel are contained, and an asynchronous transmission area ACT in which asynchronous data such as the control signal, etc. are contained.

Also, a sub-action gap SG that is a time interval to indicate the end of the isochronous transmission area ICT or the end of an sub-action SA is inserted after the end of each isochronous transmission area ICT and the end of the asynchronous transmission area ACT.

In addition, an isochronous gap IG that is a time interval to indicate the end of each packet is inserted between the isochronous packets IP and between the cycle start packet CSP and the top isochronous packet IP.

At this time, a length of the above sub-action gap SG is set longer than a length of the isochronous gap IG.

The isochronous packet IP has an IP (Isochronous Packet) header IPH that contains the information indicating an amount of data in each isochronous packet IP, the information indicating the channel for transmitting the information in each isochronous packet IP, etc., a CIP (Common Isochronous Packet) header CIPH, and a data area DF that contains A&M data.

While, the asynchronous transmission area ACT has a plurality of asynchronous sub-actions SA. Each asynchronous sub-action SA has a data packet DP in which the data such as the control information being asynchronously transmitted are contained, and an acknowledge packet ACP in which the data used for the reply from the destination node are contained.

Here, an acknowledge gap AG that is a time interval to indicate the end of the data packet DP is inserted between the data packet DP and the acknowledge packet ACP.

The data packet DP is constructed with an AP (Asynchronous Packet) header APH that contains the information indicating the address of each data packet DP, etc., and a data area ADF that contains the control signal, etc.

As described above, according to the present invention, there can be provided the transmitting apparatus and the receiving apparatus capable of eliminating the distortion of the video and also attaining the lip synchronization even when the portion in which the video and the audio are contained is reproduced.

What is claimed is:

1. A transmitting apparatus enabling to reproduce a recording medium in compliance with a flow control and to transmit video data and audio data to a network, the transmitting apparatus comprising:
   a first detecting device for detecting whether a reproduced content is a content with video;
   a second detecting device for detecting reception of a flow control cancel command output from a receiving apparatus that receives the audio data, if the reproduced content is the content with the video;
   a flow control canceling device for canceling the flow control in response to detection of the flow control cancel command; and
   wherein the flow control controls a reproducing speed not to cause overflow or underflow of a buffer.

2. The transmitting apparatus according to claim 1, further comprising:
   a generating device for generating a warning display signal;
   a device for outputting the warning display signal as a video output signal if the reproduced content is the content with video; and
   a device for outputting a video signal for the content with the video as the video output signal after the flow control is canceled.

3. The transmitting apparatus according to claim 1, further comprising:
   a device for stopping temporarily reproduction of the recording medium if the reproduced content is the content with video; and
   a device for canceling the temporary stop after the flow control is canceled.

4. A controlling method of a transmitting apparatus enabling to reproduce a recording medium in compliance with a flow control and to transmit video data and audio data to a network, comprising the steps of:
   detecting whether a reproduced content is a content with video;
   detecting reception of a flow control cancel command output from a receiving apparatus that receives the audio data, if the reproduced content is the content with the video; and
   canceling the flow control in response to detection of the flow control cancel command,
   wherein the flow control controls a reproducing speed not to cause overflow or underflow of a buffer.

5. The controlling method according to claim 4, further comprising the steps of:
   generating a warning display signal;
   outputting the warning display signal as a video output signal if the reproduced content is the content with video; and
   outputting a video signal for the content with the video as the video output signal after the flow control is canceled.

6. The controlling method according to claim 4, further comprising the steps of:
   stopping temporarily reproduction of the recording medium if the reproduced content is the content with video; and
   canceling the temporary stop after the flow control is canceled.

7. An apparatus that is capable of reproducing a recording medium in compliance with a flow control and to transmit video data and audio data to a network, comprising:
   a receiving circuit that receives the audio data; and
   a control circuit that detects whether a reproduced content is a content with video,
   wherein the control circuit detects a reception of a flow control cancel command output from the receiving circuit, if the reproduced content is the content with the video,
   wherein the control circuit cancels the flow control in response to the detection of the flow control cancel command, and
   wherein the flow control controls a reproducing speed not to cause overflow or underflow of a buffer.

* * * * *